Dec. 10, 1929.  L. DE L. CAMMANN  1,738,985
AUXILIARY LAMP
Filed June 18, 1928   2 Sheets-Sheet 1
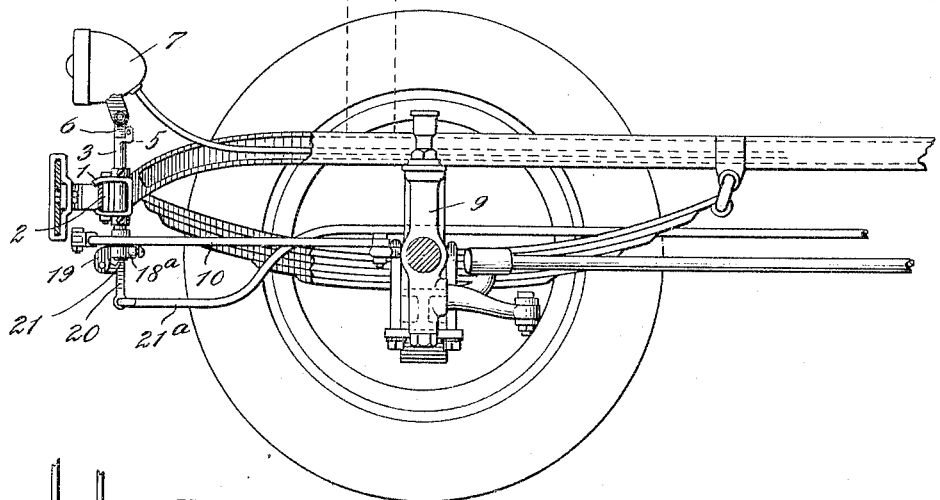
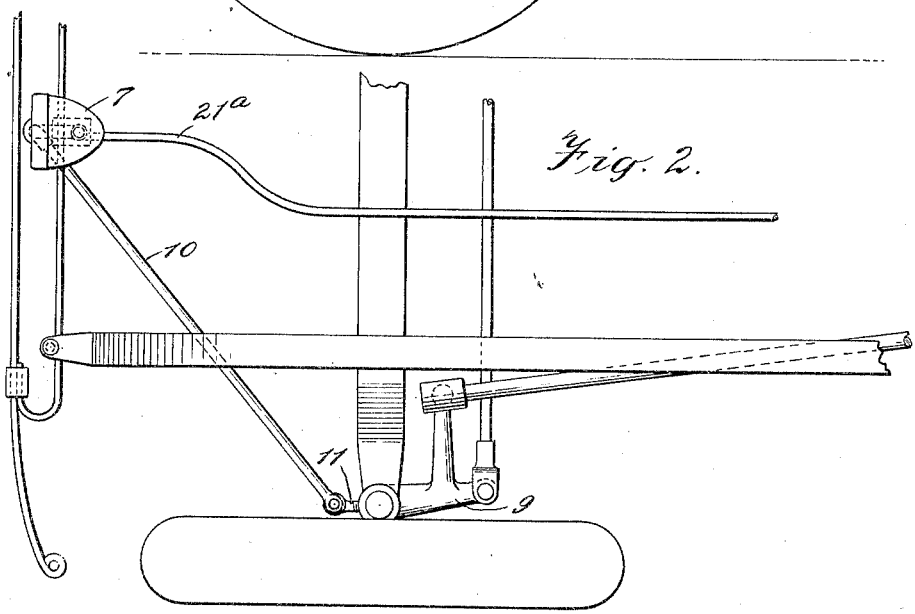
INVENTOR
Louis de L. Cammann
BY
ATTORNEY Dec. 10, 1929.  L. DE L. CAMMANN  1,738,985
AUXILIARY LAMP
Filed June 18, 1928   2 Sheets-Sheet 2

INVENTOR
Louis de L. Cammann
BY
ATTORNEY

Patented Dec. 10, 1929

1,738,985

UNITED STATES PATENT OFFICE

LOUIS DE L. CAMMANN, OF BRANDON, VERMONT

AUXILIARY LAMP

Application filed June 18, 1928. Serial No. 286,122.

My invention relates to auxiliary lamps for motor vehicles and particularly to such lamps as may be attached to a vehicle and used to supplement the regular lighting system of a motor vehicle.

Various types of auxiliary lamps are now used, because it is generally recognized that the usual headlights of a motor vehicle are insufficient since they throw a light only directly in front of the vehicle and at a constant level with respect to the ground. The obvious result is that the light from the standard equipment of a motor vehicle such as the usual headlights or even the spotlights is very ineffective when the car is traveling around a corner or up or down grade.

It is the purpose of my invention to provide an auxiliary lamp which will supplement the standard headlights and direct a strong beam of light ahead of the motor vehicle in the direction in which the motor vehicle is traveling and is about to travle, i. e. the auxiliary lamp will give a light around a curve as the vehicle is making the curve and directly on the road whether the car is traveling up hill or down hill. It is also an object of my invention to provide a lamp which will be effective even in foggy weather.

In accordance with my invention I provide a swinging and tilting lamp which may be attached to some low advantageous point such as the bumper of a vehicle and which is connected to the steering mechanism in such manner that the lamp is rotated with the steering wheels to direct a beam of light in the direction in which the steering wheels are pointed. I also provide means for tilting the lamp about a horizontal axis in order that the rays may be directed upwardly or downwardly to strike the road in front of the vehicle regardless of whether the vehicle is on an up or down grade. Suitable attachments are provided in order that the above objects may be attained regardless of the vehicle upon which the auxiliary light is placed.

A better understanding of my invention will be had from the following description taken in connection with the drawings in which:

Fig. 1 is a side elevation partly in section of the front portion of a motor vehicle having an auxiliary lamp embodying my invention attached thereto;

Fig. 2 is a plan of the front portion of a vehicle having a lamp embodying my invention attached thereto;

Figure 3:
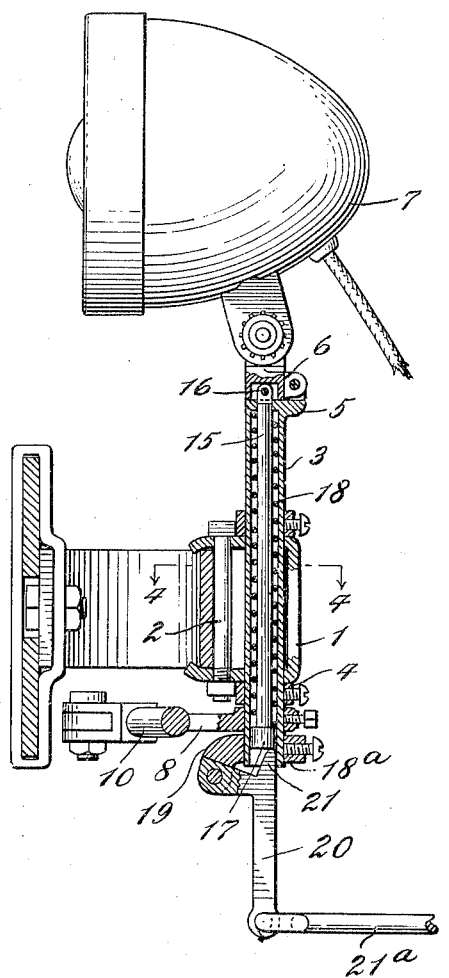
Fig. 3 is a side elevation partly in section of an auxiliary lamp constructed in accordance with my invention.
Figure 4:
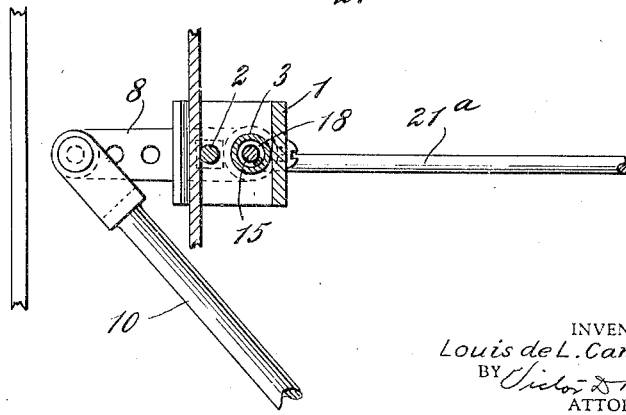
Fig. 4 is a section on line 4—4 of Fig. 3.

In the illustrated embodiment of my invention I have shown my auxiliary lamp as attached to the rear span of the front bumper by means of a U-shaped clamp and rigidly held to the bumper by means of a bolt 2. The bracket or clamp 1 is drilled to rotatably receive a vertical sleeve 3, collars 4 being positioned on the sleeve above and below the clamp to hold the sleeve 3 in desired vertical position. The upper end of the sleeve is formed with a lateral extension 5 to which is pivoted a block 6 overlying the upper end of sleeve 3 which block in turn carries the auxiliary lamp 7. Adjacent the lower end of sleeve 3 there is secured thereto an arm 8 which is connected to the spindle 9 of the motor vehicle by means of a connecting rod 10. The arm 8 may be drilled at intervals along its length to provide a plurality of points of connection with rod 10 in order to vary the arc through which the lamp will swing. As a convenient means of attachment of arm 10 to the spindle body, the spindle body may be drilled and tapped to receive an eye 11 which eye may receive the bent end of rod 10. It will be obvious from the foregoing that as the steering mechanism turns the steering wheels sleeve 3 will be rotated thereby swinging lamp 7 through an arc to light up the road as the vehicle is making a curve. In some installations it may be convenient to attach the connecting rod to the side of the brake drum rather than to the spindle.

In order that the lamp may be tilted there is provided a plunger 15 which is pivoted at its upper end at 16 to block 6 and extend down through the sleeve 3 to approximately the lower end thereof, the lower end of the plunger being enlarged as at 17 and a compression spring 18 being placed under compression between the enlarged end of the plunger and the upper end of the sleeve 3 to constantly urge block 6 down upon the extension 5. To the lower end of sleeve 3 there is secured a collar 18ª having an extended portion 19 to which is pivotally secured a cam lever 20, the cam lever having a finger portion 21 which projects into the end of sleeve 3 and engages the enlarged end 17 of plunger 15 to raise the plunger and tilt the lamp upon its horizontal pivot. The lower end of lever 20 may be drilled to receive a wire or cable 21ª which may extend upwardly to the driver's compartment of the vehicle. Thus it is seen that the driver may tilt the lamp upwardly by merely pulling cable 21ª. It is obvious that if desired the lamp 7 may be reversed and consequently lowered by the operation of lever 20.

The electrical connections may be made in any suitable manner, i. e. the auxiliary lamp may be connected in with the regular lights or the auxiliary lamp may be put on a separate circuit.

From the above description it is apparent that I have provided a tilting and swinging auxiliary lamp which may be applied to any part of a motor vehicle, preferably the front bumper and which automatically directs a light in the direction in which the front wheels of a vehicle are headed and will thus throw a light around a curve as the vehicle is making the curve. Should the car be going up hill or down hill the lamp may be raised or, if so desired, lowered according to the original installation to direct the rays of light upon the roadway at a desired distance in front of the vehicle. If desired, two such lamps may be employed, one being operated by connections to the other. It has been found that a lamp of this character is very effective in driving through a fog as the rays of light from the lamp may be controlled and kept at a low level and thus eliminating the usual appearance of a white wall in front of the vehicle when driving with the regular lamps through a heavy fog. In carrying out my invention any type of lamp may be utilized and the tilting control may be brought to any desired place, in fact, many changes may be made departing from the illustrated embodiment without departing from the spirit and scope of the invention as defined by the following claim.

I claim:

In an auxiliary lamp for motor vehicles, a clamp for attachment to a vehicle, a substantially vertical sleeve carried by said clamp for rotation and axial movement, means for limiting the axial movement, a lamp pivoted to the upper end of said sleeve, a plunger having an enlarged lower end disposed in said sleeve and operative to engage said lamp and tilt said lamp upon its pivot, a spring surrounding said rod between the upper end of said sleeve and said enlarged portion of said plunger, said spring serving to urge said plunger toward the lower end of said sleeve, a collar secured to the lower end of said sleeve and a lever pivoted to said collar, said lever having a portion contacting with the lower enlarged end of said rod, whereby said lamp may be tilted by actuating said lever.

In witness whereof, I hereunto subscribe my signature.

LOUIS DE L. CAMMANN.